(12) United States Patent
Inoue et al.

(10) Patent No.: US 9,499,210 B2
(45) Date of Patent: Nov. 22, 2016

(54) VEHICLE HOOD STRUCTURE

(71) Applicant: TOYOTA JIDOSHA KABUSHIKI KAISHA, Toyota-shi, Aichi-ken (JP)

(72) Inventors: Katsuya Inoue, Nisshin (JP); Hiroto Kawano, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/901,125

(22) PCT Filed: Jun. 26, 2014

(86) PCT No.: PCT/IB2014/001196
§ 371 (c)(1),
(2) Date: Dec. 28, 2015

(87) PCT Pub. No.: WO2014/207543
PCT Pub. Date: Dec. 31, 2014

(65) Prior Publication Data
US 2016/0152280 A1    Jun. 2, 2016

(30) Foreign Application Priority Data
Jun. 28, 2013 (JP) .................................. 2013-137429

(51) Int. Cl.
*B62D 25/12* (2006.01)
*B60R 21/34* (2011.01)
*B62D 25/10* (2006.01)

(52) U.S. Cl.
CPC .............. *B62D 25/12* (2013.01); *B60R 21/34* (2013.01); *B62D 25/105* (2013.01)

(58) Field of Classification Search
CPC ...... B62D 25/12; B62D 21/105; B60R 21/34

USPC ......................................... 296/187.04, 193.11
See application file for complete search history.

(56) References Cited

U.S. PATENT DOCUMENTS

| | | | | |
|---|---|---|---|---|
| 7,984,943 B2* | 7/2011 | Iwano | ................... | B62D 25/105 296/187.04 |
| 8,403,405 B2* | 3/2013 | Ikeda | ...................... | B60R 21/34 296/187.04 |
| 2009/0121519 A1* | 5/2009 | Ackland | .............. | B62D 25/105 296/187.09 |
| 2010/0181803 A1* | 7/2010 | Uchino | ................... | B60R 21/34 296/193.11 |

(Continued)

FOREIGN PATENT DOCUMENTS

| | | |
|---|---|---|
| EP | 1510421 A2 | 3/2005 |
| JP | 2005-343279 A | 12/2005 |

(Continued)

*Primary Examiner* — Jason S Morrow
(74) *Attorney, Agent, or Firm* — Andrews Kurth Kenyon LLP

(57) ABSTRACT

A vehicle hood structure includes a hood lock reinforcement that is provided on a vehicle lower side of an inner panel that forms a hood, and to which a striker is attached on a front side in a vehicle longitudinal direction. The hood lock reinforcement includes a step-shaped rear wall portion that is formed farther to a rear side in the vehicle longitudinal direction than the striker, on the hood lock reinforcement, and in which a rear end portion in the vehicle longitudinal direction is arranged farther to a vehicle upper side than a front end portion in the vehicle longitudinal direction, and that includes at least four ridge lines that extend in a vehicle width direction, and that includes at least two leg portions that separate at least one of the ridge lines in the vehicle width direction.

1 Claim, 12 Drawing Sheets

(56) References Cited

U.S. PATENT DOCUMENTS

| | | | |
|---|---|---|---|
| 2011/0169303 A1 | 7/2011 | Ikeda et al. | |
| 2014/0062142 A1* | 3/2014 | Ikeda | B62D 25/12 296/193.11 |
| 2016/0083019 A1* | 3/2016 | Takada | B60R 21/34 296/193.11 |
| 2016/0144898 A1* | 5/2016 | Fujii | B62D 25/105 296/191 |
| 2016/0152280 A1* | 6/2016 | Inoue | B62D 25/12 296/193.11 |

FOREIGN PATENT DOCUMENTS

| | | |
|---|---|---|
| JP | 2007-030693 A | 2/2007 |
| JP | 2008-247394 A | 10/2008 |
| JP | 2010-208556 A | 9/2010 |
| JP | 2011-037356 A | 2/2011 |
| JP | 2011-046325 A | 3/2011 |
| JP | 2012-030641 A | 2/2012 |
| WO | 2010/038504 A1 | 4/2010 |
| WO | 2012/096244 A1 | 7/2012 |
| WO | 2013/087424 A1 | 6/2013 |

\* cited by examiner

VEHICLE HOOD STRUCTURE

CROSS-REFERENCE TO RELATED APPLICATIONS

This is a national phase application based on the PCT International Patent Application No. PCT/IB2014/001196 filed Jun. 26, 2014, claiming priority to Japanese Patent Application No. 2013-137429 filed Jun. 28, 2013, the entire contents of both of which are incorporated herein by reference.

BACKGROUND OF THE INVENTION

1. Field of the Invention

The invention relates to a vehicle hood structure.

2. Description of Related Art

Japanese Patent Application Publication No. 2008-247394 (JP 2008-247394 A) describes a vehicle hood structure in which a hood lock reinforcement is provided on a vehicle lower side of an inner panel that forms a hood. With this structure, for example, a rear wall of the hood lock reinforcement is bent in a general stepped shape, and a rear end portion thereof is joined to a lower surface of the inner panel.

However, with the technology described in JP 2008-247394 A, the rear wall of the hood lock reinforcement is a single sheet and is wide in the vehicle width direction, so when a load is applied near the rear end portion of the hood lock reinforcement, the rear wall may deform unevenly, and a deformation load may increase.

SUMMARY OF THE INVENTION

The invention thus provides a vehicle hood structure capable of inhibiting a hood lock reinforcement from deforming unevenly when a load is applied to the hood lock reinforcement.

One aspect of the invention relates to a vehicle hood structure. This vehicle hood structure includes a hood lock reinforcement that is provided on a vehicle lower side of an inner panel that forms a hood, and to which a striker is attached on a front side in a vehicle longitudinal direction. The hood lock reinforcement includes a step-shaped rear wall portion that is formed farther to a rear side in the vehicle longitudinal direction than the striker, on the hood lock reinforcement, and in which a rear end portion in the vehicle longitudinal direction is arranged farther to a vehicle upper side than a front end portion in the vehicle longitudinal direction, and that includes at least four ridge lines that extend in a vehicle width direction, and that includes at least two leg portions that separate at least one of the ridge lines in the vehicle width direction.

According to this aspect, a step-shaped rear wall portion in which a rear end portion in the vehicle longitudinal direction is arranged farther to the vehicle upper side than a front end portion in the vehicle longitudinal direction, and that includes at least four ridge lines that extend in a vehicle width direction, is formed farther to a rear side in the vehicle longitudinal direction than the striker, on the hood lock reinforcement. The bending directions of the ridge lines of the step-shaped rear wall portion are oriented in opposite directions alternately from the vehicle front side toward the vehicle rear side, so the step-shaped rear wall portion will easily deform when a colliding object collides with the hood. Also, the step-shaped rear wall portion includes at least two leg portions that separate at least one of the ridge lines in the vehicle width direction, so even if a load is applied to the rear end portion on the vehicle rear side of the leg portions when the colliding object collides with the hood, the leg portions will bend easily. As a result, impact to the colliding object is able to be reduced.

Also, the bending directions of at least four ridge lines of the step-shaped rear wall portion are oriented in opposite directions alternately from the vehicle front side toward the vehicle rear side, so a load from the striker when the hood is closed is able to be inhibited from concentrating at a portion of the hood lock reinforcement.

In the aspect described above, the hood lock reinforcement may include a reinforcing portion that provides reinforcement with respect to bending of the one ridge line due to a load applied from the striker when the hood is closed may be provided on at least one of the leg portions.

Also, according to this structure, a reinforcing portion that provides reinforcement with respect to bending of the one ridge line is provided on at least one of the leg portions, so bending of the one ridge line due to a load applied from the striker when the hood is closed is inhibited by the reinforcing portion. Therefore, the leg portion is able to display support rigidity with respect to the load applied from the striker, so the concentration of stress generated in the hood lock reinforcement is reduced. As a result, durability is able to be improved.

With this structure, the reinforcing portion may be provided crossing over, in the vehicle longitudinal direction, at least a first ridge line that is bent to an opposite side with respect to a ridge line of a highest portion, when the ridge lines are counted from the ridge line of the highest portion toward a vehicle front.

According to this structure, the reinforcing portion is provided crossing over, in the vehicle longitudinal direction, at least a first ridge line that is bent to an opposite side with respect to a ridge line of a highest portion, when the ridge lines are counted from the ridge line of the highest portion toward a vehicle front. As a result, the leg portion is able to display support rigidity with respect to a load applied from the striker when the hood is closed, so the concentration of stress generated in the hood lock reinforcement is able to be more reliably reduced.

According to this aspect of the invention, it is possible to inhibit a hood lock reinforcement from deforming unevenly when a load is applied to the hood lock reinforcement.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
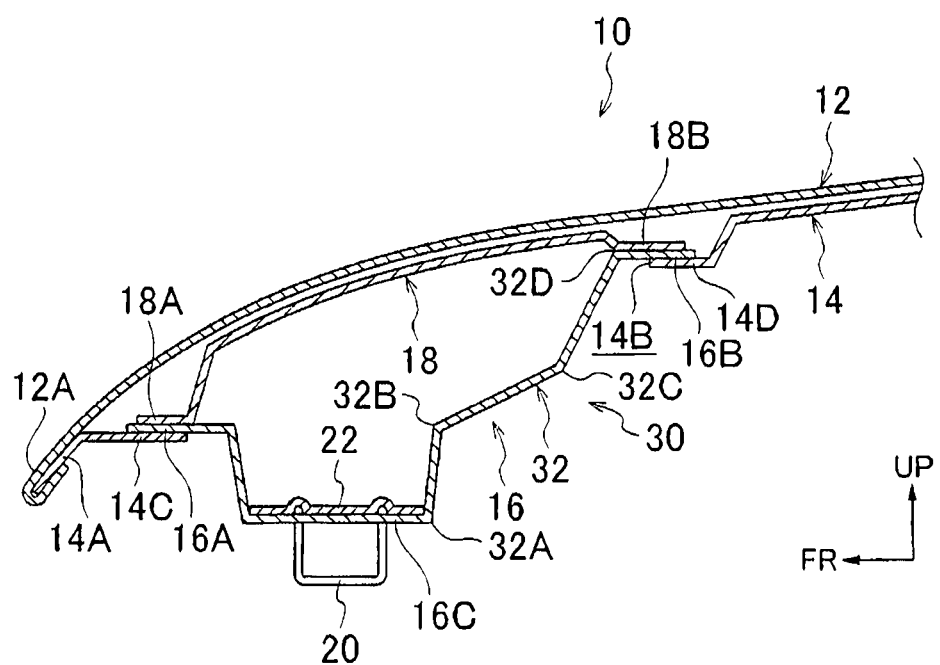
FIG. 1 is a longitudinal sectional view of a cross-section near a hood lock reinforcement of a hood to which a vehicle hood structure according to a first example embodiment of the invention is applied.

Hereinafter, a first example embodiment of the vehicle hood structure according to the invention will be described with reference to FIGS. 1 to 6. In the drawings, arrow FR indicates a vehicle front side, arrow UP indicates a vehicle upper side, and arrow OUT indicates a vehicle width direction outside.

FIG. 1 is a longitudinal sectional view of an area near a hood lock reinforcement of a hood to which a vehicle hood structure according to this example embodiment is applied. As shown in the drawing, a hood 10 to which a vehicle hood structure 30 of this example embodiment is applied includes a hood outer panel 12 that is arranged along generally the vehicle width direction and generally the vehicle longitudinal direction, on the vehicle upper side (the vehicle outside), and a hood inner panel 14 as an inner panel that is arranged along generally the vehicle width direction and generally the vehicle longitudinal direction, on a vehicle lower side of this hood outer panel 12.

A peripheral edge portion 12A of the hood outer panel 12 is bent back to a peripheral edge portion 14A of the hood inner panel 14 and joined thereto by hemming. An opening 14B is formed on a front side of the hood inner panel 14 in the vehicle longitudinal direction. An intermediate portion in the vehicle longitudinal direction of a hood lock reinforcement 16 that is depressed in a recessed shape toward the vehicle lower side is arranged inside this opening 14B. Generally flat flange portions 16A and 16B are formed on a front end and a rear end, respectively, of the hood lock reinforcement 16 in the vehicle longitudinal direction. Lateral wall portions 14C and 14D are formed on front and rear sides, respectively, of the opening 14B of the hood inner panel 14 in the vehicle longitudinal direction.

A lower surface of the flange portion 16A on the front end of the hood lock reinforcement 16 is arranged on an upper surface of the lateral wall portion 14C on the front side of the opening 14B of the hood inner panel 14, and the flange portion 16A and the lateral wall portion 14C are joined together by welding or the like. A lower surface of the flange portion 16B on the rear end of the hood lock reinforcement 16 is arranged on an upper surface of the lateral wall portion 14D on the rear side of the opening 14B of the hood inner panel 14, and the flange portion 16B and the lateral wall portion 14D are joined together by welding or the like.

A dent reinforcement 18 that is bent in a protruding shape toward the vehicle upper side is arranged on the vehicle upper side of the hood lock reinforcement 16. This dent reinforcement 18 forms part of the inner panel of the invention. Generally flat flange portions 18A and 18B are formed on a front end and a rear end, respectively, of the dent reinforcement 18 in the vehicle longitudinal direction. A lower surface of the flange portion 18A on the front end of the dent reinforcement 18 is arranged on an upper surface of the flange portion 16A on the front end of the hood lock reinforcement 16, and the two are joined together by welding or the like. A lower surface of the flange portion 18B on the rear end of the dent reinforcement 18 is arranged on an upper surface of the flange portion 16B on a rear end of the hood lock reinforcement 16, and the two are joined together by welding or the like. When the vehicle is viewed from the side, a space is formed in a vehicle vertical direction between a vehicle longitudinal direction intermediate portion of the hood lock reinforcement 16 and a vehicle longitudinal direction intermediate portion of the dent reinforcement 18.

Figure 2:
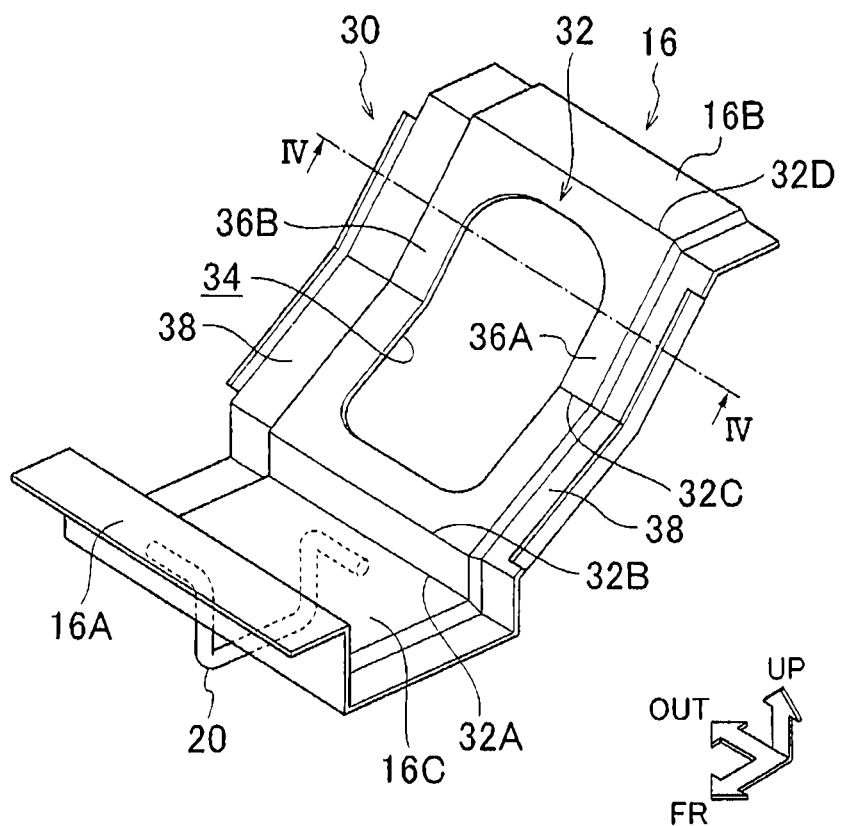
FIG. 2 is a perspective view of the hood lock reinforcement used in the vehicle hood structure according to the first example embodiment.

A generally flat bottom wall portion 16C that is bent in a recessed shape toward the vehicle lower side is formed to the vehicle rear of the flange portion 16A, on a front side of the hood lock reinforcement 16 in the vehicle longitudinal direction (see FIG. 2). A striker 20 that locks to a vehicle main body (not shown) side is attached to this bottom wall portion 16C. The striker 20 is a generally U-shaped member that is arranged in the vehicle longitudinal direction, and hangs down toward the vehicle main body side from the hood lock reinforcement 16, with both end portions contacting the upper surface side of the bottom wall portion 16C of the hood lock reinforcement 16. A base plate 22 that fixes the striker 20 to the bottom wall portion 16C is attached to the upper surface side of the bottom wall portion 16C of the hood lock reinforcement 16. The striker 20 keeps the hood 10 closed on the vehicle main body side by engaging with a latch portion, not shown, on the vehicle main body.

Figure 3:
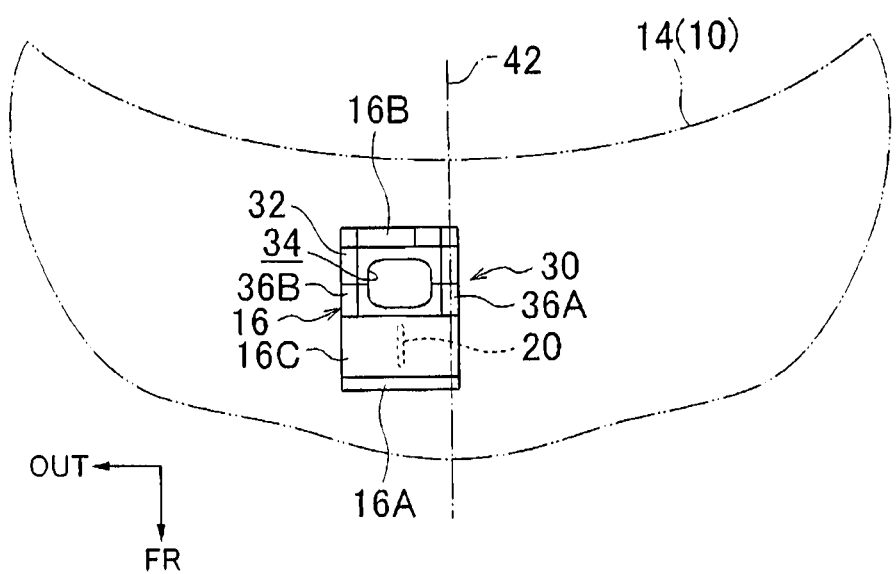
FIG. 3 is a plan view of the hood to which the vehicle hood structure according to the first example embodiment is applied, as viewed from a vehicle upper side of a hood inner panel.

Although not shown, the hood 10 is arranged covering an engine room provided in a front portion of the vehicle main body from above. The hood 10 is configured so as to be able to open and close with respect to the vehicle main body, by hinge arms, not shown, provided on both end portions in the vehicle width direction. As shown in FIG. 3, when viewed from the vehicle front side, the hood lock reinforcement 16 is arranged on a portion that is offset to the vehicle left side (i.e., the vehicle right side when viewed from a driver's seat) with respect to a center portion 42 in the vehicle width direction of the hood inner panel 14 that forms the hood 10. That is, when viewed from the vehicle front side, the striker 20 of the hood lock reinforcement 16 is not on a center portion of the hood 10 in the vehicle width direction, but rather is offset to the vehicle left side with respect to the center portion 42.

As shown in FIGS. 1 and 2, the hood lock reinforcement 16 includes a generally step-shaped rear wall portion 32, in which a vehicle longitudinal direction rear end portion is arranged farther to the vehicle upper side than a vehicle longitudinal direction front end portion, provided on the vehicle rear side of the bottom wall portion 16C to which the striker 20 is attached. In this example embodiment, the generally step-shaped rear wall portion 32 includes four ridge lines 32A, 32B, 32C, and 32D that extend in the vehicle width direction. The four ridge lines 32A, 32B, 32C, and 32D are arranged at intervals in order from the vehicle front side, with the bending directions of the ridge lines 32A, 32B, 32C, and 32D oriented in opposite directions alternately from the vehicle front side toward the vehicle rear side.

As shown in FIG. 2, a generally rectangular open portion 34 having rounded corners is formed in the center portion of the rear wall portion 32. The open portion 34 is formed in a position separating one of the ridge lines, i.e., the ridge line 32C, in the vehicle width direction. That is, the rear wall portion 32 includes two leg portions 36A and 36B that separate the one ridge line 32C in the vehicle width direction, one on each side of the open portion 34 in the vehicle width direction. The two leg portions 36A and 36B are arranged in generally the vehicle longitudinal direction. By providing these two leg portions 36A and 36B, when a colliding object 44 collides with the hood 10 from the vehicle upper side, the leg portions 36A and 36B will deform more easily than a wide plate-shaped rear wall portion without the two leg portions (i.e., the leg portions 36A and 36B will bend easily), thus reducing the impact applied to the colliding object 44 (see FIG. 6).

Figure 4:
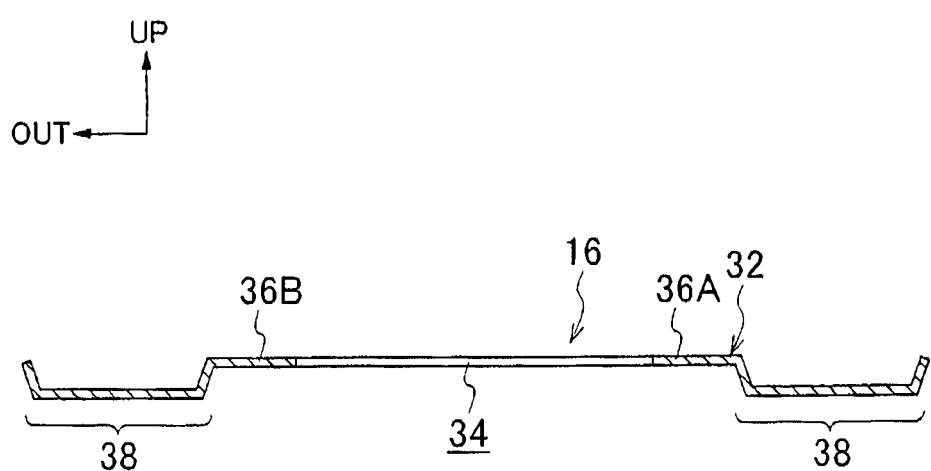
FIG. 4 is a sectional view (an end view) of a rear wall portion of the hood lock reinforcement taken along line IV-IV in FIG. 2.

As shown in FIG. 4 as well, a reinforcing portion 38 that provides reinforcement with respect to bending of the one ridge line C when a load from the striker 20 is applied when the hood 10 is closed, is provided on each of the two leg portions 36A and 36B. This reinforcing portion 38 has a recessed shaped (a flat, generally U-shaped) cross-section that is bent toward the vehicle lower side, in a sectional view along the vehicle width direction. The reinforcing portions 38 are formed bilaterally symmetrical on the two leg portions 36A and 36B.

As shown in FIG. 2, the reinforcing portion 38 is provided in an area crossing over, in the vehicle longitudinal direction, at least the first ridge line 32C that is bent to the opposite side with respect to the ridge line 32D of the highest portion, when the ridge lines are counted from the ridge line 32D of the highest portion toward the vehicle front. The ridge line 32D of the highest portion forms the flange portion 16B that is joined to the hood inner panel 14. In this example embodiment, the reinforcing portion 38 is provided in an area (which extends slightly to the vehicle front side of the leg portions 36A and 36B) that includes almost the entire region in the vehicle longitudinal direction of the two leg portions 36A and 36B provided on both sides of the open portion 34 in the vehicle width direction.

Figure 5:
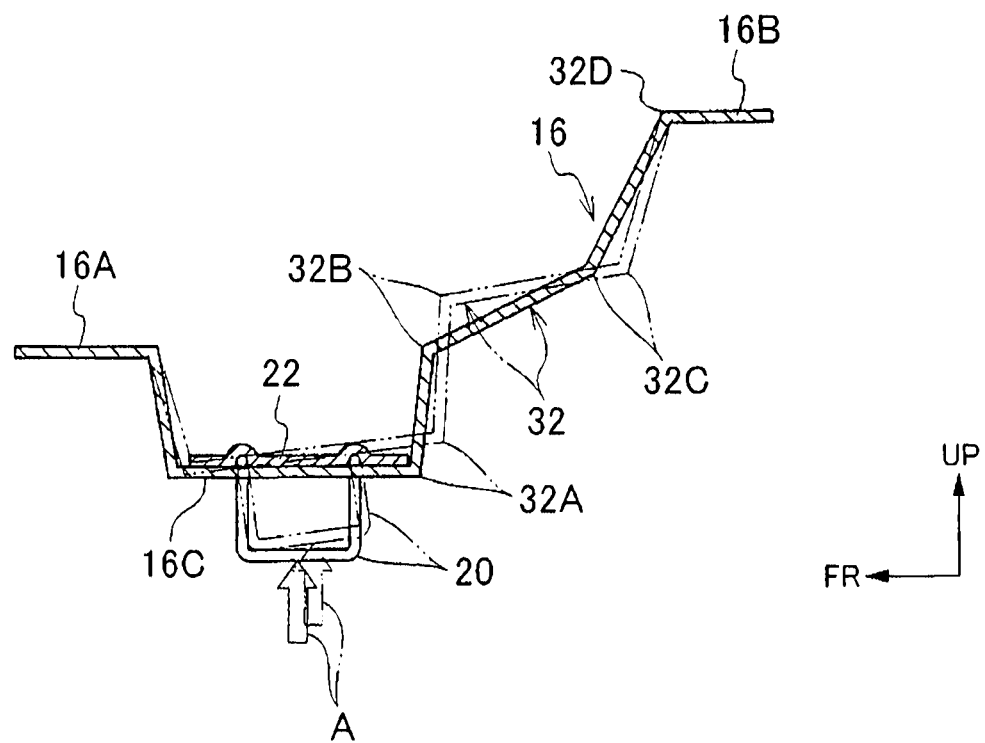
FIG. 5 is a longitudinal sectional view illustrating a deformation state of the hood lock reinforcement with respect to an upward load from a striker when the hood of the invention is closed.

When the hood 10 is closed, an upward load (i.e., a load in the direction of arrow A) acts on the striker 20 of the hood lock reinforcement 16, and the step-shaped rear wall portion 32 consequently deforms, as shown in FIG. 5. At this time, stress is able to be generated substantially evenly at the ridge lines 32A, 32B, 32C, and 32D by having the bending directions of the four ridge lines 32A, 32B, 32C, and 32D be oriented in opposite directions alternately from the vehicle front side toward the vehicle rear side. Also, bending of the ridge line 32C with respect to an upward load acting on the striker 20 when the hood 10 is closed is inhibited, so support rigidity is able to be displayed, by providing the two leg portions 36A and 36B one on each side of the open portion 34 of the rear wall portion 32 in the vehicle width direction, and forming the reinforcing portion 38 on each of the two leg portions 36A and 36B.

Here, before describing the operation and effects of this example embodiment, a typical vehicle hood structure will be described.

Hood strength is able to be improved by increasing the thickness of the hood lock reinforcement, for example. However, typically, increasing the thickness of the hood lock reinforcement may increase the impact when a colliding object collides with the hood. Meanwhile, reduction of the impact when a colliding object collides with the hood is able to be realized by, for example, reducing the plate thickness of the hood lock reinforcement, or adding holes to the hood lock reinforcement 16, but these will reduce the strength of the hood. That is, there is a conflicting relationship between improving the strength of the hood and reducing the impact on a colliding object.

Next, the operation and effects of the vehicle hood structure of the example embodiment will be described.

One conceivable structure that both improves the strength of the hood and reduces the impact on a colliding object is described below. Failure will result if the stress that acts on the hood lock reinforcement is equal to or greater than a reference value. However, if the stress when the hood is closed is substantially even over the entire hood lock reinforcement, the strength can be just above reference value at all of the portions of the hood lock reinforcement. As a result, the hood lock reinforcement is not too strong, so the impact when a colliding object collides with the hood at a given position other than the center portion of the hood lock reinforcement is able to be reduced.

With the vehicle hood structure 30 of this example embodiment, when the hood 10 is closed, an upward load (i.e., a load in the direction of arrow A) is applied to the striker 20 of the hood lock reinforcement 16, and the step-shaped rear wall portion 32 consequently deforms such that the bending angles of the four ridge lines 32A, 32B, 32C, and 32D change, as shown in FIG. 5. At this time, the bending directions of the four ridge lines 32A, 32B, 32C, and 32D are oriented in opposite directions alternately in order from the vehicle front side to the vehicle rear side, so stress is able to be generated substantially evenly in the step-shaped rear wall portion 32.

Figure 10A:
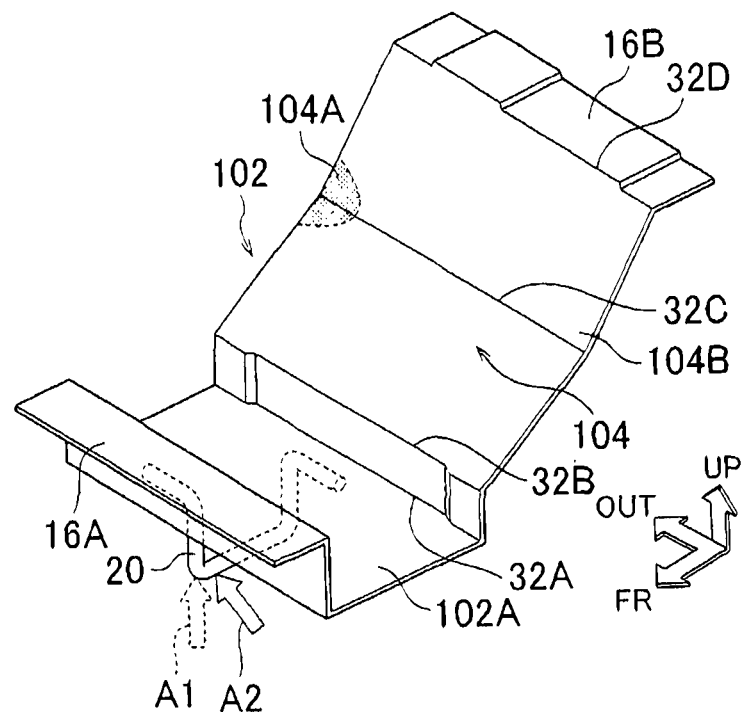
FIG. 10A is a perspective view illustrating a deformation state of a hood lock reinforcement with respect to a load from a striker when a hood is closed, in hood lock reinforcement according to a first comparative example.

Here, as shown in FIG. 10A, with a hood lock reinforcement 102 used in a vehicle hood structure of a first comparative example, a generally step-shaped rear wall portion 104 is provided to the vehicle rear side of a bottom wall portion 102A to which a striker 20 of the hood lock reinforcement 102 is attached. An open portion such as that in the example embodiment is not provided in the rear wall portion 104.

With this hood lock reinforcement 102, the rear wall portion 104 of the hood lock reinforcement 102 is formed by a plate that is wide in the vehicle width direction, Therefore, when the hood is closed, a phenomenon occurs in which there is a portion where stress concentrates locally at a surface of an end portion 104A on one side of the rear wall portion 104 in the vehicle width direction, while stress at a surface of an end portion 104B that is on the opposite side in the vehicle width direction is low. In particular, when there is no lock mechanism on the center portion of the hood in the vehicle width direction (see FIG. 3), there may be no perpendicular input of the direction of arrow A1, but there may be input inclined in the direction of arrow A2, in which case the effect of stress concentration such as that described above will increase. At this time, if the plate thickness of the hood lock reinforcement 102 is increased in order to increase the strength of the portion where stress concentrates, the deformation load when a colliding object collides with the hood will increase, and the impact will be greater.

With the hood lock reinforcement 16 of the example embodiment, the open portion 34 is formed so as to separate the ridge line 32C in the vehicle width direction, in the center portion of the rear wall portion 32, and the two leg portions 36A and 36B are provided one on each side of the open portion 34 in the vehicle width direction, while the reinforcing portion 38 having a generally U-shaped cross-section is formed on each of the leg portions 36A and 36B, as shown in FIG. 2. As a result, bending of the ridge line 32C of the leg portions 36A and 36B with respect to an upward load applied from the striker 20 when the hood 10 is closed is able to be inhibited. Therefore, stress is able to be generated by displaying support rigidity, even at a portion (e.g., the leg portion 36A) where the stress is low on the side opposite a portion (e.g., the leg portion 36B) where stress in the vehicle width direction concentrates when the hood 10 is closed, so stress is able to be generated more evenly over the entire hood lock reinforcement 16 (i.e., stress is able to be inhibited from concentrating at a portion of the hood lock reinforcement 16).

Figure 10B:
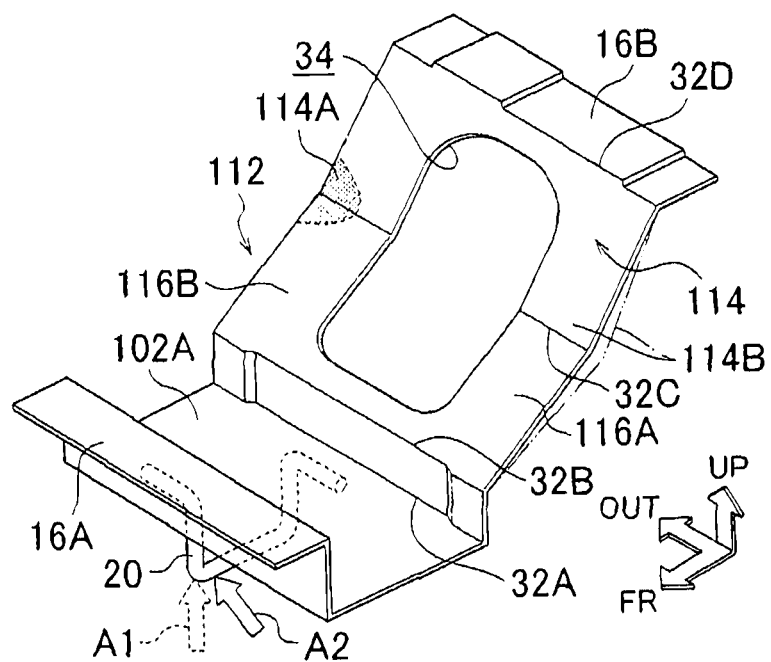
FIG. 10B is a perspective view illustrating a deformation state of a hood lock reinforcement with respect to a load from a striker when a hood is closed, in hood lock reinforcement according to a second comparative example.

Here, as shown in FIG. 10B, with a hood lock reinforcement 112 used in a vehicle hood structure of a second comparative example, an open portion 34 is formed so as to separate the ridge line 32C in the center portion of a step-shaped rear wall portion 114 of the hood lock reinforcement 112, and two leg portions 116A and 116B are provided one on each side of this open portion 34 in the vehicle width direction. These two leg portions 116A and 116B are formed by plate-like bodies, and no reinforcing portion such as that in the example embodiment is provided.

With this hood lock reinforcement 112, when the hood is closed, compared to a portion of an end portion 114A on one side in the vehicle width direction where stress concentrates, the support rigidity at a portion of the end portion 114B on the opposite side where stress is low is insufficient, so an area near the ridge line 32C of the leg portion 116A bends. That is, stress is not able to be generated at the end portion 114B on the opposite side in the vehicle width direction, so this portion remains a portion where stress is low.

In contrast to this, with the hood lock reinforcement 16 of the example embodiment, the reinforcing portion 38 is provided on each of the leg portions 36A and 36B, so stress is able to be generated by displaying support rigidity also at the portion where stress is low on the side opposite the portion where stress in the vehicle width direction concentrates when the hood is closed. Therefore, the concentration of stress that occurs in the hood lock reinforcement 16 is reduced so durability is able to be improved. Also, providing the reinforcing portion 38 on each of the leg portions 36A and 36B enables the rigidity of the hood 10 to be ensured. Furthermore, by having two of the leg portions 36A and 36B, the positions of the leg portions 36A and 36B can be set independently, so adjustments at the design stage are more easily made, and the timing at which the leg portions 36A and 36B start to deform when a colliding object collides with the hood is able to be controlled.

Figure 11A:
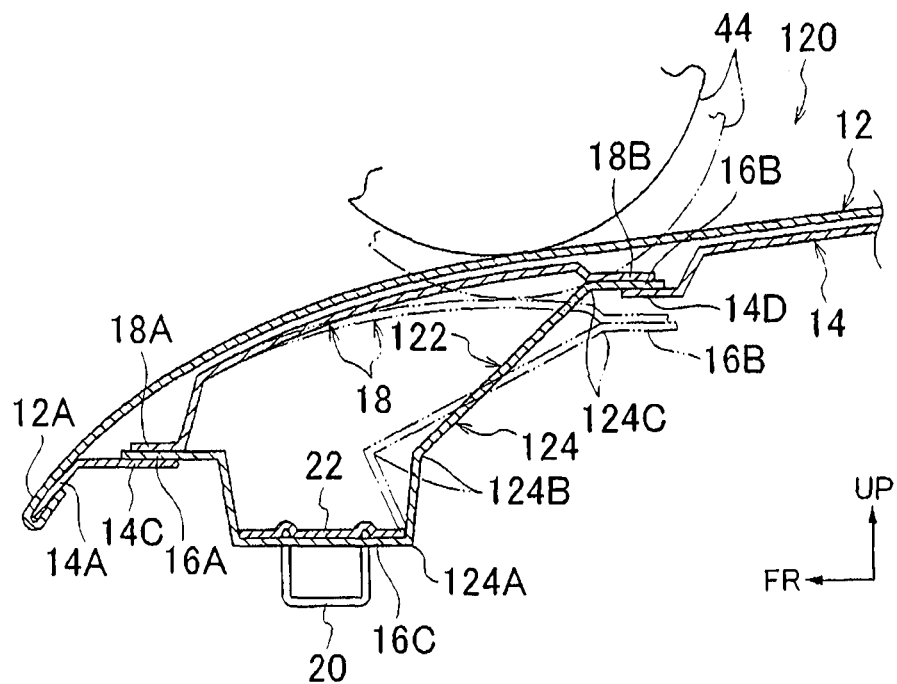
FIG. 11A is a longitudinal sectional view of a deformation state when a colliding object has collided with a hood to which a vehicle hood structure according to a third comparative example is applied.
Figure 11B:
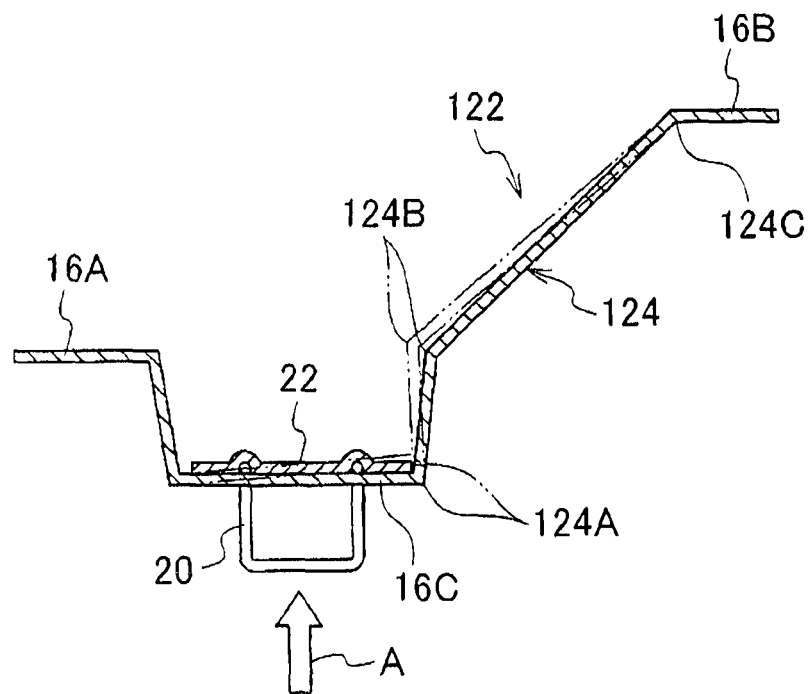
FIG. 11B is a longitudinal sectional view of a deformation state of a hood lock reinforcement with respect to a load from a striker when a hood having the vehicle hood structure according to the third comparative example is closed.

Here, as shown in FIGS. 11A and 11B, with a hood 120 to which a vehicle hood structure of a third comparative example is applied, a hood lock reinforcement 122 includes a rear wall portion 124, in which a vehicle longitudinal direction rear end portion is arranged farther to a vehicle upper side than a vehicle longitudinal direction front end portion, on a vehicle rear side of a bottom wall portion 16C to which a striker 20 is attached. The rear wall portion 124 includes three ridge lines 124A, 124B, and 124C that extend in the vehicle width direction. Of the three ridge lines 124A, 124B, and 124C, the bending directions of two of the ridge lines 124B and 124C that are adjacent on the vehicle rear side are oriented in the same direction, i.e., upward with respect to the vehicle. That is, with the hood lock reinforcement 122, a portion between these two ridge lines 124B and 124C is formed in a generally planar shape (i.e., a generally linear shape in a sectional view), so compared to the hood lock reinforcement 16 of the example embodiment, there is no third ridge line 32C from the vehicle front side (see FIG. 6).

As shown in FIG. 11B, when the hood 120 is closed, a generally flat portion between the two ridge lines 124B and 124C of the hood lock reinforcement 122 stretches with respect to an upward load (i.e., a load in the direction of arrow A) from the striker 20, and stress concentrates at the joint. That is, the input from the ridge line 124B to the ridge line 124C becomes excessive, and the likelihood of failure at the ridge line 124C or the flange portion 16B increases. A case in which the colliding object 44 collides with the hood 120 from above (i.e., above with respect to the vehicle vertical direction), shown in FIG. 11B, will be described later.

Figure 12:
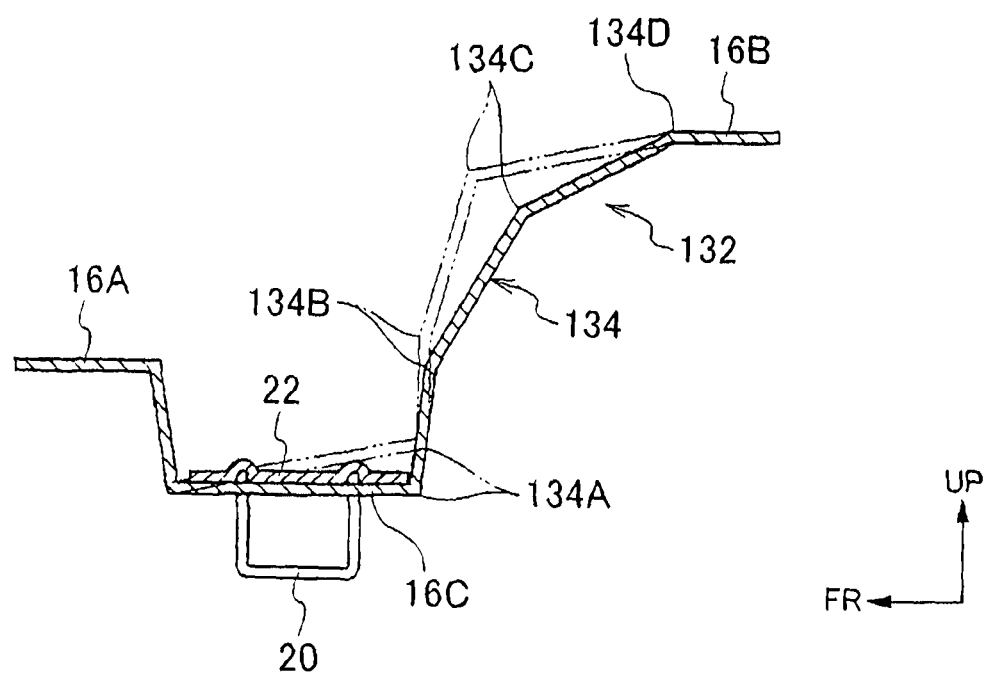
FIG. 12 is a longitudinal sectional view of a deformation state of a hood lock reinforcement with respect to a load from a striker when a hood is closed, in a hood lock reinforcement used in a vehicle hood structure according to a fourth comparative example.

Also, as shown in FIG. 12, a hood lock reinforcement 132 used in a vehicle hood structure of a fourth comparative example includes a rear wall portion 134, in which a vehicle longitudinal direction rear end portion is arranged farther to a vehicle upper side than a vehicle longitudinal direction front end portion, provided on the vehicle rear side of a bottom wall portion 16C to which a striker 20 is attached. The rear wall portion 134 includes four ridge lines 134A, 134B, 134C, and 134D that extend in the vehicle width direction. Of these four ridge lines 134A, 134B, 134C, and 134D, the bending directions of three of the ridge lines 134B, 134C, and 134D that are adjacent on the vehicle rear side are oriented in the same direction, i.e., upward with respect to the vehicle. That is, in a sectional view, with the hood lock reinforcement 132, as compared to the hood lock reinforcement 16 of the example embodiment, the bending direction of the third ridge line 134C from the vehicle front side is oriented in the opposite direction from the ridge line 32C of the hood lock reinforcement 16 (see FIG. 5).

As shown in FIG. 12, with this hood lock reinforcement 132, when the hood is closed, deformation concentrates only at the third ridge line 134C from the vehicle front side (see the chain double-dashed line in FIG. 12), so the endurance strength is less than it is with the hood lock reinforcement 16 of the example embodiment.

In contrast to this, with the hood lock reinforcement 16 of the example embodiment, the bending directions of the four ridge lines 32A, 32B, 32C, and 32D are oriented in opposite directions alternately in order from the vehicle front side toward the vehicle rear side, as shown in FIG. 5, so stress is able to be generated substantially evenly at the step-shaped rear wall portion 32 when the hood 10 is closed.

Also, with the hood lock reinforcement 16 of the example embodiment, the two leg portions 36A and 36B are provided one on each side of the open portion 34 in the vehicle width direction, and the reinforcing portion 38 having a generally U-shaped cross-section is formed on each of the two leg portions 36A and 36B. At this time, the reinforcing portion 38 is provided in an area crossing over, in the vehicle longitudinal direction, at least the first ridge Line 32C that is bent to the opposite side with respect to the ridge line 32D of the highest portion, when the ridge lines are counted from the ridge line 32D of the highest portion toward the vehicle front side. As a result, bending of the ridge line 32C of the leg portions 36A and 36B with respect to an upward load applied from the striker 20 when the hood 10 is closed is able to be inhibited. Therefore, even if inclined input is applied to the striker 20 when the hood 10 is closed, stress is able to be generated by displaying support rigidity, even at a portion where the stress is low on the side opposite the portion where stress in the vehicle width direction concentrates, so stress is able to be generated more evenly over the entire hood lock reinforcement 16.

Figure 6:
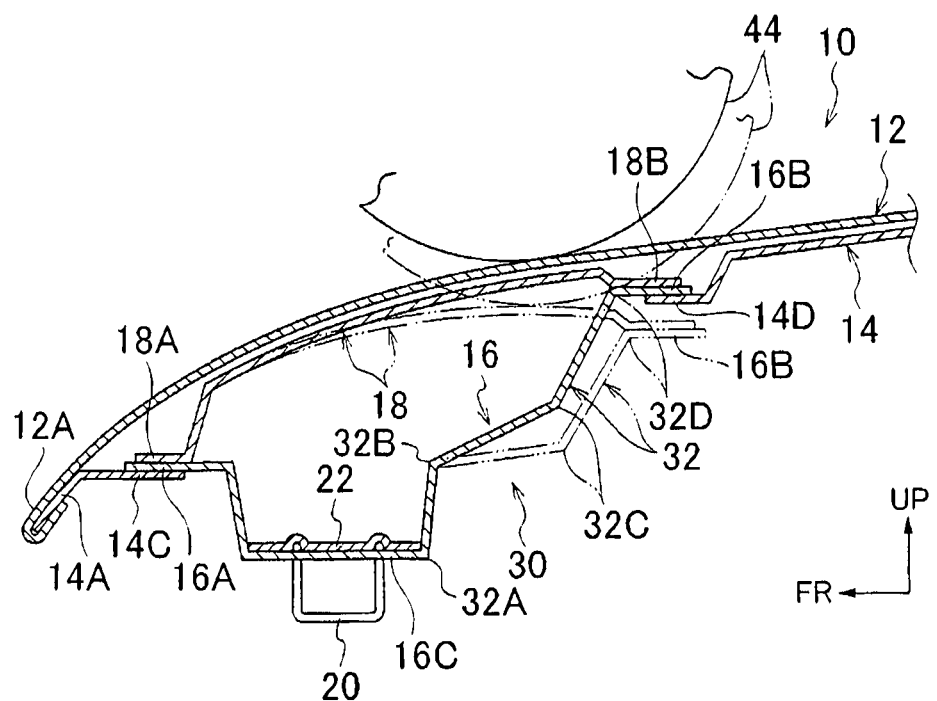
FIG. 6 is a longitudinal sectional view of a deformation state on a front side of the hood when a colliding body collides with the hood of the invention.

As shown in FIG. 6, the hood lock reinforcement 16 includes the two leg portions 36A and 36B one on each side of the open portion 34 in the vehicle width direction, so when the colliding object 44 collides with the hood 10 from above (i.e., above with respect to the vehicle vertical direction), the two leg portions 36A and 36B will easily bend. That is, the open portion 34 is provided on the hood lock reinforcement 16, so deformation of one of the leg portions leg portions 36A and 36B will not be inhibited by the leg portion on the opposite side. Also, when the colliding object 44 collides, the step-shaped rear wall portion 32 that includes the four ridge lines 32A, 32B, 32C, and 32D will easily deform (see the chain double-dash line in FIG. 6), so the impact to the colliding object 44 is able to be reduced.

Here, with the hood lock reinforcement 102 shown in FIG. 10A, the rear wall portion 104 is formed by a plate that is wide in the vehicle width direction, so at times other than when a colliding object collides with the center portion in the vehicle width direction, the rear wall portion 104 will deform unevenly and the deformation load will increase.

Also, with the hood 120 shown in FIG. 11A, when the colliding object 44 collides with the hood 120 from above (i.e., above with respect to the vehicle vertical direction), the generally flat portion between the two ridge lines 124B and 124C of the hood lock reinforcement 122 stretches (see the chain double-dash line in FIG. 11A), and the deformation load is large.

In contrast, with the hood lock reinforcement 16 of the example embodiment, when the colliding object 44 collides with the hood 10, the two leg portions 36A and 36B provided one on each side of the open portion 34 bend easily, so impact to the colliding object 44 can be reduced.

Next, hood lock reinforcements used in vehicle hood structures according to second and third example embodiments of the invention will be described with reference to FIGS. 7A and 7B. Component parts that are similar to those in the first example embodiment described above will be denoted by like reference characters, and descriptions of these parts will be omitted.

Figure 7A:
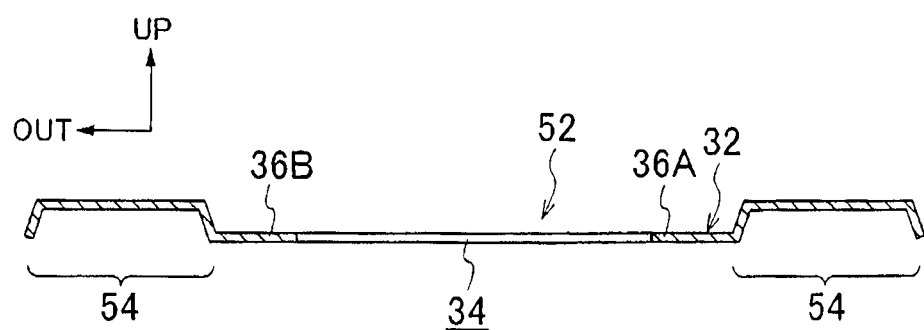
FIG. 7A is a sectional view (an end view) of a rear side of a hood lock reinforcement used in a vehicle hood structure according to a second example embodiment of the invention.

As shown in FIG. 7A, with a hood lock reinforcement 52 used in the vehicle hood structure according to the second example embodiment, a reinforcing portion 54 is provided on each of two leg portions 36A and 36B one on each side of an open portion 34 in the vehicle width direction. The reinforcing portion 54 has a protrusion-shaped (a flat, inverted U-shaped) cross-section that is bent toward the vehicle upper side in a sectional view along the vehicle width direction. The reinforcing portions 54 are formed bilaterally symmetrical on the two leg portions 36A and 36B. With this kind of hood lock reinforcement 52 as well, stress is generated by the leg portions 36A and 36B displaying support rigidity when the hood is closed, so stress is able to be generated more evenly over the entire hood lock reinforcement 52.

Figure 7B:
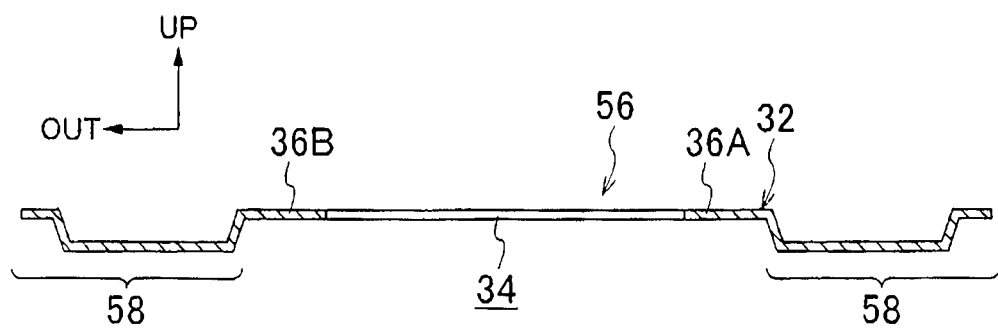
FIG. 7B is a sectional view (an end view) of a rear side of a hood lock reinforcement used in a vehicle hood structure according to a third example embodiment of the invention.

As shown in FIG. 7B, with a hood lock reinforcement 56 used in the vehicle hood structure according to the third example embodiment, a reinforcing portion 58 is provided on each of two leg portions 36A and 36B one on each side of an open portion 34 in the vehicle width direction. The reinforcing portion 58 has a generally hat-shaped cross-section that is bent so as to protrude in a recessed shape toward the vehicle lower side in a sectional view along the vehicle width direction. The reinforcing portions 58 are formed bilaterally symmetrical on the two leg portions 36A and 36B. With this kind of hood lock reinforcement 56 as well, stress is generated by the leg portions 36A and 36B displaying support rigidity when the hood is closed, so stress is able to be generated more evenly over the entire hood lock reinforcement 56.

Next, a hood lock reinforcement used in a vehicle hood structure according to a fourth example embodiment of the invention will be described with reference to FIG. 8. Component parts that are similar to those in the first to the third example embodiments described above will be denoted by like reference characters, and descriptions of these parts will be omitted.

Figure 8:
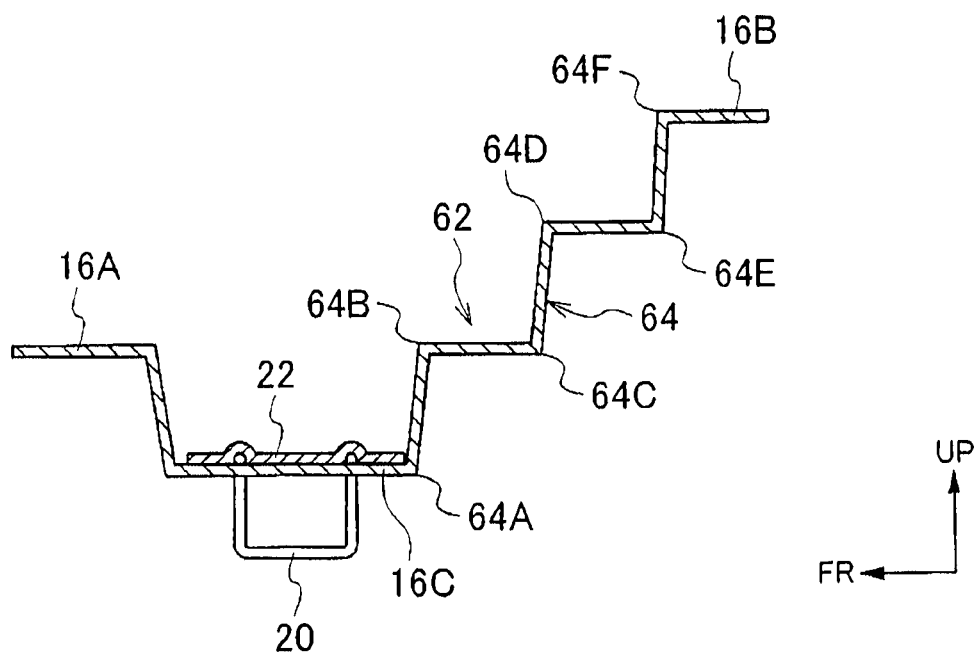
FIG. 8 is a longitudinal sectional view of a hood lock reinforcement used in a vehicle hood structure according to a fourth example embodiment of the invention.

As shown in FIG. 8, with a hood lock reinforcement 62 used in the vehicle hood structure according to the fourth example embodiment, a generally step-shaped rear wall portion 64, in which a vehicle longitudinal direction rear end portion is arranged farther to the vehicle upper side than a vehicle longitudinal direction front end portion, is provided to the vehicle rear side of a bottom wall portion 16C to which a striker 20 is attached. The generally step-shaped rear wall portion 64 includes six ridge lines 64A, 64B, 64C, 64D, 64E, and 64F that extend in the vehicle width direction. The six ridge lines 64A, 64B, 64C, 64D, 64E, and 64F are arranged at intervals in order from the vehicle front side, and the bending directions are oriented in opposite directions alternately from the vehicle front side toward the vehicle rear side.

Also, although not shown, the generally step-shaped rear wall portion 64 has an open portion formed in the central portion in the vehicle width direction, and a reinforcing portion is provided on each of two leg portions formed one on each side of the open portion in the vehicle width direction. At this time, the reinforcing portion is provided in an area crossing over, in the vehicle longitudinal direction, at least the ridge line 64E that is bent in the opposite direction from the first ridge line 64F when the ridge lines are counted from the ridge line 64F of the highest portion toward the vehicle front side. In this example embodiment, the reinforcing portion is formed in an area that crosses over, in the vehicle longitudinal direction, the three ridge lines on the vehicle front side of the ridge line 64F of the highest portion, i.e., the ridge lines 64C, 64D, and 64E, for example. The area that crosses over these three ridge lines 64C, 64D, and 64E in the vehicle longitudinal direction is substantially the same as the area where the open portion is provided in the vehicle longitudinal direction.

With this kind of hood lock reinforcement 62, the bending directions of the six ridge lines 64A, 64B, 64C, 64D, 64E, and 64F are oriented in opposite directions alternately in order from the vehicle front side to the vehicle rear side, so substantially even stress is able to be generated in the generally step-shaped rear wall portion 64 when the hood is closed. Also, with the hood lock reinforcement 62, the two leg portions are provided one on each side of the open portion in the vehicle width direction, and the reinforcing portion is formed on each of the two leg portions. Therefore, even if inclined input is applied to the striker 20 when the hood is closed, stress is able to be generated by displaying support rigidity, even at a portion where the stress is low on the side opposite the portion where stress in the vehicle width direction concentrates, so stress is able to be generated more evenly over the entire hood lock reinforcement 62.

Also, when a colliding object collides with the hood from above (i.e., above in the vehicle vertical direction), the two leg portions of the hood lock reinforcement 62 will bend easily. Also, when the colliding object collides, the generally step-shaped rear wall portion 64 that includes the six ridge lines 64A, 64B, 64C, 64D, 64E, and 64F will easily deform, so impact to the colliding object is able to be reduced.

Next, a hood lock reinforcement used in a vehicle hood structure according to a fifth example embodiment of the invention will be described with reference to FIG. 9. Component parts that are similar to those in the first to the fourth example embodiments described above will be denoted by like reference characters, and descriptions of these parts will be omitted.

Figure 9:
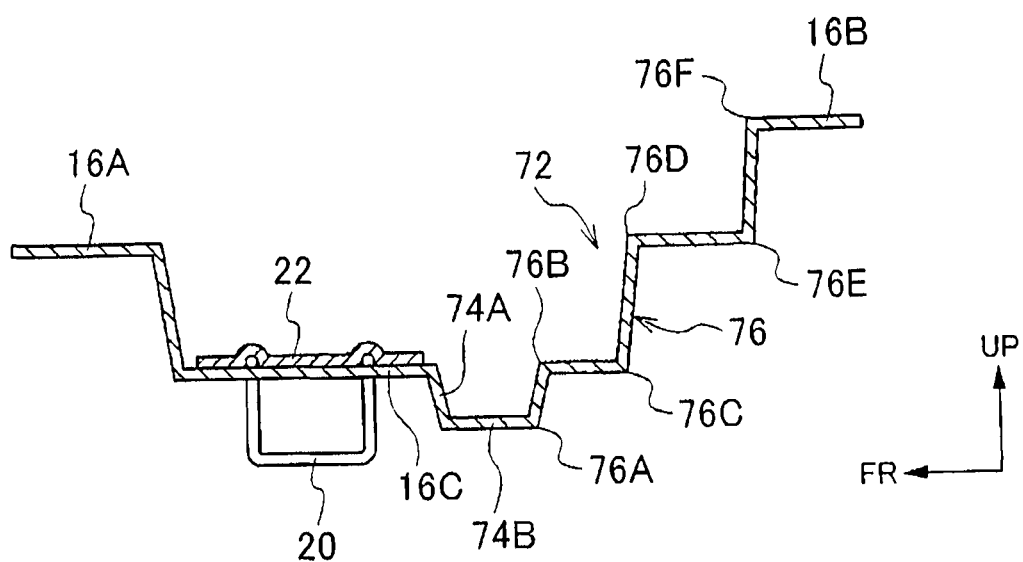
FIG. 9 is a longitudinal sectional view of a hood lock reinforcement used in a vehicle hood structure according to a fifth example embodiment of the invention.

As shown in FIG. 9, a hood lock reinforcement 72 used in the vehicle hood structure according to the fifth example embodiment includes an up-and-down wall portion 74A that is bent toward the vehicle lower side, and a lateral wall portion 74B that extends toward the vehicle rear side from a lower end portion of the up-and-down wall portion 74A, provided to the vehicle rear side of a bottom wall portion 16C to which a striker 20 is attached. Furthermore, the hood lock reinforcement 72 includes a generally step-shaped rear wall portion 76, in which a vehicle longitudinal direction rear end portion is arranged farther to the vehicle upper side than a vehicle longitudinal direction front end portion, provided to the vehicle rear side of the lateral wall portion 74B. The generally step-shaped rear wall portion 76 includes six ridge lines 76A, 76B, 76C, 76D, 76E, and 76F. The six ridge lines 76A, 76B, 76C, 76D, 76E, and 76F are arranged at intervals in order from the vehicle front side, and the bending directions are oriented in opposite directions alternately from the vehicle front side toward the vehicle rear side.

Also, although not shown, the generally step-shaped rear wall portion 76 has an open portion formed in the central portion in the vehicle width direction, and a reinforcing portion is provided on each of two leg portions formed one on each side of the open portion in the vehicle width direction. At this time, the reinforcing portion is provided in an area crossing over, in the vehicle longitudinal direction, at least the ridge line 76E that is bent in the opposite direction from the first ridge line 76F, when the ridge lines are counted from the ridge line 76F of the highest portion toward the vehicle front side. In this example embodiment, the reinforcing portion is formed in an area that crosses over, in the vehicle longitudinal direction, the three ridge lines 76C, 76D, and 76E, for example. The area that crosses over these three ridge lines 76C, 76D, and 76E in the vehicle longitudinal direction is substantially the same as the area where the open portion is provided in the vehicle longitudinal direction.

With this kind of hood lock reinforcement 72, the bending directions of the six ridge lines 76A, 76B, 76C, 76D, 76E, and 76F are oriented in opposite directions alternately in order from the vehicle front side to the vehicle rear side, so substantially even stress is able to be generated in the generally step-shaped rear wall portion 76 when the hood is closed. Also, with the hood lock reinforcement 72, the two leg portions are provided one on each side of the open portion in the vehicle width direction, and the reinforcing portion is formed on each of the two leg portions. Therefore, even if inclined input is applied to the striker 20 when the hood is closed, stress is able to be generated by displaying support rigidity, even at a portion where the stress is low on the side opposite a portion where stress in the vehicle width direction concentrates, so stress is able to be generated more evenly over the entire hood lock reinforcement 72.

Also, when a colliding object collides with the hood from above (i.e., above in the vehicle vertical direction), the two leg portions of the hood lock reinforcement 72 will bend easily. Also, when the colliding object collides, the generally step-shaped rear wall portion 76 that includes the six ridge lines 76A, 76B, 76C, 76D, 76E, and 76F will easily deform, so impact to the colliding object is able to be reduced.

In the first to the fifth example embodiments described above, a lock mechanism is provided in a position offset to the outside on one side in the vehicle width direction from the center portion of the hood in the vehicle width direction, but the invention is not limited to this. That is, the example embodiments may also be applied to a case in which a lock mechanism is provided at the center portion of the hood in the vehicle width direction. In a case in which the lock mechanism is provided in the center portion of the hood in the vehicle width direction as well, the vehicle hood structures of the example embodiments are able to display effects with improved robustness and the like.

Also, in the first to the fifth example embodiments described above, the open portion that separates at least one ridge line in the vehicle width direction is provided in the center portion of the hood lock reinforcement in the vehicle width direction, and the two leg portions are provided one on each side of the open portion in the vehicle width direction, but the invention is not limited to this structure. For example, a structure in which two or more open portions are provided in the hood lock reinforcement, and three or more leg portions that extend in generally the vehicle longitudinal direction are provided, is also possible. Also, a structure in which an open portion that separates two or more ridge lines in the vehicle width direction is provided in the center portion of the hood lock reinforcement in the vehicle width direction, and a leg portion is provided on both sides of the open portion in the vehicle width direction, is also possible.

Also, in the first to the fifth example embodiments described above, the reinforcing portion is provided on each of the two leg portions of the hood lock reinforcement, but the invention is not limited to this structure. For example, a structure in which a reinforcing portion is provided on only the side with a portion where the stress is low on the side opposite a portion where stress tends to concentrate on one side of the hood lock reinforcement in the vehicle width direction, when the hood is closed, is also possible.

Also, the reinforcing portion provided on the leg portion of the hood lock reinforcement may be formed by a rib (a generally T-shaped rib) that protrudes from the leg portion, or by a generally L-shaped rib in which a hole is cut in a portion of a plate and the resulting flap (i.e., the cut portion) is bent up, or the like.

Moreover, in the first to the fifth example embodiments described above, the dent reinforcement 18 is arranged on the front side of the hood inner panel 14, and the hood lock reinforcement is provided on the vehicle lower side of the dent reinforcement 18, but the invention is not limited to this. For example, a structure in which the dent reinforcement is not provided, and the hood lock reinforcement is provided on the vehicle lower side of the hood inner panel, is also possible. That is, the vehicle lower side of the inner panel that forms the hood is intended to include not only a case in which the hood lock reinforcement is provided on the vehicle lower side of the hood inner panel, but also a case in which the hood lock reinforcement is provided on the vehicle lower side of the dent reinforcement arranged on the front side of the hood inner panel.

What is claimed is:

1. A vehicle hood structure comprising
a hood lock reinforcement that is provided on a vehicle lower side of an inner panel that forms a hood, and to which a striker is attached on a front side in a vehicle longitudinal direction, wherein
the hood lock reinforcement includes a step-shaped rear wall portion that is formed farther to a rear side in the vehicle longitudinal direction than the striker, on the hood lock reinforcement, and in which a rear end portion in the vehicle longitudinal direction is arranged farther to a vehicle upper side than a front end portion in the vehicle longitudinal direction, and that includes at least four ridge lines that extend in a vehicle width direction, and that includes at least two leg portions that separate at least a first ridge line in the vehicle width direction, the first ridge line being the first ridge line that is bent to an opposite side with respect to a ridge line of the highest portion, when the ridge lines are counted from the ridge line of the highest portion toward a vehicle front,
the hood lock reinforcement including a reinforcing portion that is provided on at least one of the leg portions, and that provides reinforcement with respect to bending of at least one of the ridge lines due to a load applied from the striker when the hood is dosed, the reinforcing portion being provided crossing over, in the vehicle longitudinal direction; at least the first ridge line.

* * * * *